United States Patent Office 2,821,485
Patented Jan. 28, 1958

2,821,485

STABILIZED WAXES RESISTANT TO DISCOLORATION BY LIGHT

Robert W. Provine, Lawrence T. Mehlhorn, Warren L. Thompson, and John Vernon Lawson, Tulsa, Okla., assignors, by mesne assignments, to D-X Sunray Oil Company, Tulsa, Okla., a corporation of Delaware No Drawing. Application August 9, 1954
Serial No. 448,782

7 Claims. (Cl. 106—270)

The present invention relates to waxes and waxy compositions the color of which is stabilized against the influence of light, so that the material, when it once has been bleached to the desired color, will not substantially darken in color even under comparatively long continued influence of incident light rays.

The invention is primarily directed to the treatment of paraffin wax, but it is to be understood that it is also applicable to the treatment of paraffin waxes of a semi-refined nature, and to paraffin wax in combination with micro-crystalline wax and also to mixtures of paraffin wax with such high molecular weight materials as polyethylene, and waxy materials in general.

It is a well known fact that paraffin waxes, even when highly refined, often become colored under the influence of light; which is particularly disadvantageous when the waxes are used, for example, for the sealing of food packages and the like, where any discoloration will often be looked upon as possibly being indicative of the deterioration of the contents of the container sealed by means of the wax.

It is therefore one of the objects of the present invention to produce mixtures of wax or waxy materials which contain small but effective amounts of organic chemicals which inhibit the action of light upon the wax or waxy materials.

It is a further object of the invention to produce a mixture of wax or waxy materials with certain N-substituted amino benzoic acid compounds and the esters thereof, which have been found by the inventors, even when used in relatively small amounts, to stabilize the material against darkening under the influence of light.

The materials which lend themselves for the carrying out of the present invention are primarily N-substituted amino benzoic acid compounds in which the carboxyl or acyl group is in the number 1 position on an aromatic nucleus while a substituted amino group is located upon one of the other positions of the aromatic nucleus, and primarily either in the ortho or para position, although the meta position is not to be excluded.

Broadly speaking, the material employed for the practice of the present invention may have the structural formula:

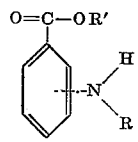

in which R and R' may represent hydrogen, acyl, aryl, alkyl, alkenyl, alkyl-aryl, and aryl-alkyl groups, and in which the

group may be in the ortho, meta, or para positions relative to the O=C—OR' group.

The substance of the above characteristics may be incorporated with the wax in amounts of from 0.0001% up to about 1.0% by weight, the preferred range being between 0.01 and 0.1% by weight.

The following description is illustrative of the method of carrying out the present invention, and of the effectiveness of a number of materials used.

The wax used was a paraffin having an ASTM melting point of 130° F., and color, as measured in a 6" Lovibond Cell (500 Series Amber) of 0.4, while the oil content as determined by ASTM methods was 0.6%.

Samples of this wax were tested in two different ways; the first series of test samples of the wax were put into tall 4 oz. bottles and hung in direct sunlight for a total period of eight hours (two days from 10 A. M. to 2 P. M. each day) whereafter the exposed samples were carefully melted and their colors determined.

In another series of tests the wax was poured into an aluminum pan to a depth of from about one-fourth to one-half inch in thickness, and allowed to solidify. The slab thus prepared was then placed in direct sunlight for a period of eight hours (two days from 10 A. M. to 2 P. M. each day) whereafter the exposed samples were carefully melted and their color determined. In the subjoined Table I the effects are tabulated:

*Table I*

| Sample | Color 6" Lovibond Cell (500 Series Amber) Exposed in— | |
|---|---|---|
| | 4 oz. bottle | Slab |
| Semi-Refined Wax—no inhibitor | 30 | 50 |
| +0.1% N-Methyl Anthranilic Acid | 17 | |
| +0.01% N-Phenyl Anthranilic Acid | 8 | 11 |
| +0.01% p-Acetamido Benzoic Acid | 20 | 40 |
| +0.01% p-Benzoylamido Benzoic Acid | | 31 |
| Semi-Refined Wax—no inhibitor | 33 | |
| +0.01% N-Pheny. Anthranilic Acid | 8 | |
| Semi-Refined Paraffin Wax—no inhibitor | | 30 |
| 80% Semi-Refined Paraffin wax +20% Stearic Acid Triple Pressed—no inhibitor | | 30 |
| +0.01% N-Phenyl Anthranilic Acid | | 8 |
| +0.01% p-Acetamido Benzoic Acid | | 23 |
| 95% Semi-Refined Paraffin Wax +5% Polyethylene (12,000 M. W.)—no inhibitor | | 45 |
| +0.01% N-Phenyl Anthranilic Acid | | 12 |
| +0.01% p-Acetamido Benzoic Acid | | 40 |
| 90% Semi-Refined Paraffin Wax +10% 190 White Microcrystalline Wax—no inhibitor | | 45 |
| +0.01% N-Phenyl Anthranilic Acid | | 9 |
| +0.01% p-Acetamido Benzoic Acid | | 40 |

It will be seen that for the semi-refined wax an exposure of eight hours to direct sunlight increased the color from 0.4 up to 30. However, when 0.1% N-methyl anthranilic acid has been added, the color only rose to 17, while with only 0.01% of N-phenyl anthranilic acid added the color was as low as 8.

With the 0.01% of benzoylamido benzoic acid, the color, which in the slab, exposed to light without the inhibitor, had risen to 50, was now only 31, while with the N-phenyl anthranilic acid the color had risen in the slab to only 11, which shows the particular effectiveness of that compound.

It will be noticed that further in the table mixtures are shown, such for example as 80% of semi-refined paraffin wax plus 20% stearic acid triple pressed. The color of this mixture, without an inhibitor, upon eight hours exposure to sunlight, rose to 30, while in the presence of 0.01% of N-phenyl anthranilic acid it rose only to 8.

The next mixture consisted of 95% of semi-refined paraffin wax mixed with 5% of polyethylene having a molecular weight of 12,000. This mixture, without the use of an inhibitor, and on eight hours exposure to sunlight, developed a color of 45. However, with 0.01% of N-phenyl anthranilic acid the color rose to only 12.

The final mixture consisted of 90% of a semi-refined paraffin wax and 10% of 190 white microcrystalline wax. In that case the presence of the 0.01% of N-phenyl anthranilic acid permitted the color to rise to only 9, as compared to 45 without the use of an inhibitor.

Other materials which have been found effective are the following:

p-Acetamido benzoic acid
o-N-phenyl amino benzoic acid (=N-phenyl anthranilic acid)
o-N-methyl amino benzoic acid
p-N-1-butenylamino benzoic acid
o-N-tolylamino benzoic acid
p-Benzylamino benzoic acid
Anthranilic acid All of these were used in amounts of 0.1%.

It was found, however, by experimentation, that even very minute amounts, on the order of 0.0001% gave recognizable results in the prevention of discoloration of the wax on exposure to sunlight.

The method of introducing the material is extremely simple, it being merely thoroughly stirred into the molten wax before the same is cast into slabs or other forms for commercial distribution. In the amounts used the inhibitors are all completely miscible with the molten waxes.

In addition to the free acids the esters may also be used, for example: Methyl anthranilate, butenyl anthranilate and phenyl anthranilate.

It is not intended to limit the present invention to the particular method of incorporation of these ingredients, provided only that the desired products are obtained, the color change of which is inhibited by the presence of the materials mentioned in the claims.

Applicants claim:

1. A composition consisting essentially of wax, the color of which is stabilized against substantial changes caused by light, comprising wax and from about 0.0001% to about 1% of an N-substituted amino benzoic acid compound having the general structural formula

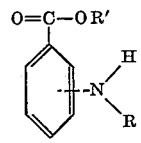

in which R and R' represent hydrogen, acyl, aryl, alkyl, alkenyl, alkyl-aryl, and aryl-alkyl groups, and in which the

group may be in the ortho, meta or para position relative to the O=C—OR' group.

2. The composition as claimed in claim 1 in which the wax is paraffin wax.
3. A composition as claimed in claim 1 in which R' is H, and R is phenyl.
4. A composition as claimed in claim 1 in which R' is H, and R is benzyl.
5. A composition as claimed in claim 1 in which R' is H, and R is benzoyl.
6. A composition as claimed in claim 1 in which R' is H, and R is methyl.
7. A composition as claimed in claim 1 in which R' and R are both hydrogen, the amino group being ortho to the COOH group.

References Cited in the file of this patent
UNITED STATES PATENTS

| | | |
|---|---|---|
| 2,300,612 | Christmann | Nov. 3, 1942 |
| 2,367,712 | Bradley | Jan. 23, 1945 |
| 2,369,090 | Trautman | Feb. 6, 1945 |
| 2,371,289 | Hamilton et al. | Mar. 13, 1945 |
| 2,569,122 | Adelson | Sept. 25, 1951 |
| 2,652,332 | Olcott et al. | Sept. 15, 1953 |
| 2,653,854 | Schaar | Sept. 29, 1953 |